(12) United States Patent
Tyler et al.

(10) Patent No.: US 12,107,422 B2
(45) Date of Patent: *Oct. 1, 2024

(54) SYSTEMS AND METHODS FOR VOLT-AMPERE REACTIVE CONTROL AND OPTIMIZATION

(71) Applicant: Dominion Energy, Inc., Richmond, VA (US)

(72) Inventors: Stephen J. Tyler, Henrico County, VA (US); Melissa A. Peskin, Richmond, VA (US)

(73) Assignee: Dominion Energy, Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,724

(22) Filed: Mar. 27, 2023

(65) Prior Publication Data
US 2023/0246441 A1 Aug. 3, 2023

Related U.S. Application Data

(63) Continuation of application No. 16/460,530, filed on Jul. 2, 2019, now Pat. No. 11,626,735, which is a continuation of application No. 14/993,181, filed on Jan. 12, 2016, now Pat. No. 10,367,354.

(60) Provisional application No. 62/102,324, filed on Jan. 12, 2015.

(51) Int. Cl.
*H02J 3/16* (2006.01)
*G05B 15/02* (2006.01)
*H02J 3/18* (2006.01)

(52) U.S. Cl.
CPC ............ *H02J 3/16* (2013.01); *G05B 15/02* (2013.01); *H02J 3/1828* (2013.01); *Y02E 40/30* (2013.01)

(58) Field of Classification Search
CPC .......... H02J 3/16; H02J 3/1828; G05B 15/02; Y02E 40/30
See application file for complete search history.

(56) References Cited

U.S. PATENT DOCUMENTS

| | | | |
|---|---|---|---|
| 4,204,150 | A | 5/1980 | Mathieu |
| 5,422,561 | A | 6/1995 | Williams et al. |
| 8,941,261 | B2 | 1/2015 | Shaffer |
| 8,954,203 | B2 | 2/2015 | Arditi et al. |
| 9,031,708 | B2 | 5/2015 | Penzenstadler et al. |
| 9,917,436 | B2 | 3/2018 | Popescu |
| 10,135,247 | B2 | 11/2018 | Fisher et al. |
| 10,554,257 | B2 | 2/2020 | Hansell et al. |
| 10,680,438 | B2 | 6/2020 | Divan et al. |
| 2003/0185150 | A1 | 10/2003 | Matsumoto et al. |
| 2003/0187550 | A1 | 10/2003 | Wilson et al. |

(Continued)

OTHER PUBLICATIONS

US Department of Energy, "Application of Automated Controls for Voltage and Reactive Power Management—Initial Results", 2012 pp. 40, downloaded from the internet https://www.energy.gov/sites/prod/files/2016/10/f33/VVO_Report—_Final_Dec. 2012.pdf (Year:2012).

*Primary Examiner* — Robert E Fennema
*Assistant Examiner* — Olvin Lopez Alvarez
(74) *Attorney, Agent, or Firm* — Blank Rome LLP

(57) ABSTRACT

A method, apparatus, system and computer program is provided for optimizing and controlling volt-amperes reactive on an electrical control system. System-level and local-level measurements are determined and analyzed to prioritize and optimize which VAR adjusters are adjusted.

21 Claims, 6 Drawing Sheets

(56) References Cited

U.S. PATENT DOCUMENTS

| | | |
|---|---|---|
| 2004/0260488 A1 | 12/2004 | Al-Hamrani |
| 2005/0251296 A1 | 11/2005 | Nelson et al. |
| 2009/0276170 A1 | 11/2009 | Bickel |
| 2010/0250012 A1 | 9/2010 | Arinaga et al. |
| 2010/0250018 A1 | 9/2010 | Hauf et al. |
| 2011/0035067 A1 | 2/2011 | Larsson et al. |
| 2011/0144817 A1 | 6/2011 | Teichmann et al. |
| 2011/0169461 A1 | 7/2011 | Deaver, Sr. |
| 2011/0248567 A1 | 10/2011 | Brown et al. |
| 2012/0098346 A1 | 4/2012 | Garrity et al. |
| 2012/0104850 A1 | 5/2012 | Fallis et al. |
| 2012/0271479 A1 | 10/2012 | Schmid et al. |
| 2013/0024032 A1 | 1/2013 | Vukojevic et al. |
| 2013/0030579 A1 | 1/2013 | Milosevic et al. |
| 2013/0030591 A1 | 1/2013 | Powell et al. |
| 2013/0030597 A1 | 1/2013 | Milosevic et al. |
| 2013/0030599 A1 | 1/2013 | Milosevic et al. |
| 2013/0107598 A1 | 5/2013 | Rojas |
| 2013/0140817 A1 | 6/2013 | Yin |
| 2013/0245846 A1 | 9/2013 | Bellacicco et al. |
| 2014/0288725 A1 | 9/2014 | Itaya |
| 2014/0319912 A1 | 10/2014 | Bell |
| 2014/0350743 A1 | 11/2014 | Asghari et al. |
| 2015/0054339 A1 | 2/2015 | Zhao et al. |
| 2015/0236509 A1 | 8/2015 | Divan et al. |
| 2016/0094034 A1 | 3/2016 | Divan et al. |
| 2017/0060161 A1 | 3/2017 | Tyler et al. |
| 2017/0147024 A1 | 5/2017 | Powell et al. |
| 2017/0235323 A1 | 8/2017 | Divan et al. |
| 2017/0256944 A1 | 9/2017 | Hui et al. |
| 2018/0052478 A1 | 2/2018 | Varma |

SYSTEMS AND METHODS FOR VOLT-AMPERE REACTIVE CONTROL AND OPTIMIZATION

This application is a continuation of U.S. patent application Ser. No. 16/460,530, filed Jul. 2, 2019; which is a continuation of U.S. patent application Ser. No. 14/993,181, filed Jan. 12, 2016, and claims priority under 35 U.S.C. § 119(e) to U.S. Provisional Patent Application Ser. No. 62/102,324 filed on Jan. 12, 2015, which are each hereby incorporated by reference in their entirety.

BACKGROUND

Electricity is commonly generated at a power station by electromechanical generators, which are typically driven by heat engines fueled by chemical combustion or nuclear fission, or driven by kinetic energy flowing from water or wind. The electricity is generally supplied to end users through transmission grids as an alternating current signal. The transmission grids may include a network of power stations, transmission circuits, substations, and the like.

The generated electricity is typically stepped-up in voltage using, for example, generating step-up transformers, before supplying the electricity to a transmission system. Stepping up the voltage improves transmission efficiency by reducing the electrical current flowing in the transmission system conductors, while keeping the power transmitted nearly equal to the power input. The stepped-up voltage electricity is then transmitted through the transmission system to a distribution system, which distributes the electricity to end users. The distribution system may include a network that carries electricity from the transmission system and delivering it to end users. Typically, the network may include medium-voltage (for example, less than 69 kV) power lines, electrical substations, transformers, low-voltage (for example, less than 1 kV) distribution wiring, electric meters, and the like.

The following, the entirety of each of which is herein incorporated by reference, describe subject matter related to power generation or distribution: Engineering Optimization Methods and Applications, First Edition, G. V. Reklaitis, A. Ravindran, K. M. Ragsdell, John Wiley and Sons, 1983; Estimating Methodology for a Large Regional Application of Conservation Voltage Reduction, J. G. De Steese, S. B. Merrick, B. W. Kennedy, IEEE Transactions on PowERSs, 1990; Power Distribution Planning Reference Book, Second Edition, H. Lee Willis, 2004; Implementation of Conservation Voltage Reduction at Commonwealth Edison, IEEE Transactions on PowERSs, D. Kirshner, 1990; Conservation Voltage Reduction at Northeast Utilities, D. M. Lauria, IEEE, 1987; Green Circuit Field Demonstrations, EPRI, Palo Alto, CA, 2009, Report 1016520; Evaluation of Conservation Voltage Reduction (CVR) on a National Level, PNNL-19596, Prepared for the U.S. Department of Energy under Contract DE-AC05-76RL01830, Pacific Northwest National Lab, July 2010; Utility Distribution System Efficiency Initiative (DEI) Phase 1, Final Market Progress Evaluation Report, No 3, E08-192 (July 2008) E08-192; Simplified Voltage Optimization (VO) Measurement and Verification Protocol, Simplified VO M&V Protocol Version 1.0, May 4, 2010; MINITAB Handbook, Updated for Release 14, fifth edition, Barbara Ryan, Brian Joiner, Jonathan Cryer, Brooks/Cole-Thomson, 2005; Minitab Software, http://www.minitab.com/en-US/products/minitab/Statistical Software provided by Minitab Corporation.

Further, U.S. patent application 61/176,398, filed on May 7, 2009 and U.S. publication 2013/0030591 entitled VOLTAGE CONSERVATION USING ADVANCED METERING INFRASTRUCTURE AND SUBSTATION CENTRALIZED VOLTAGE CONTROL, the entirety of which is herein incorporated by reference, describe a voltage control and energy conservation system for an electric power transmission and distribution grid configured to supply electric power to a plurality of user locations. U.S. patent application 61/800,396, filed on Mar. 15, 2013, and U.S. patent application Ser. No. 14/193,552, filed Feb. 28, 2014, entitled MAXIMIZING OF ENERGY DELIVERY SYSTEM DELIVERY SYSTEM COMPATIBILITY WITH VOLTAGE OPTIMIZATION USING AMI-BASED DATA CONTROL AND ANALYSIS, the entirety of each are herein incorporated by reference, describe a voltage control system for making the voltage optimization system for an electrical delivery system compatible with high variation distributed generation and loads. U.S. patent application 61/789,085, filed on Mar. 15, 2013, and U.S. patent application Ser. No. 14/193,190, filed Feb. 28, 2014, entitled ELECTRIC POWER SYSTEM CONTROL WITH MEASUREMENT OF ENERGY DEMAND AND ENERGY EFFICIENCY USING T-DISTRIBUTIONS, the entirety of each are herein incorporated by reference, describe measuring the effects of optimizing voltage, conserving energy, and reducing demand using t distributions. U.S. patent application 61/800,028, filed on Mar. 15, 2013, and U.S. patent application Ser. No. 14/193,770, filed Feb. 28, 2014, entitled MANAGEMENT OF ENERGY DEMAND AND ENERGY EFFICIENCY SAVINGS FROM VOLTAGE OPTIMIZATION ON ELECTRIC POWER SYSTEMS USING AMI-BASED DATA ANALYSIS, the entirety of each are herein incorporated by reference, describe improved controlling of the voltage on distribution circuits with respect to optimizing voltage, conserving energy, reducing demand and improving reliability. U.S. patent application 61/794,623, filed on Mar. 15, 2013, and U.S. patent application Ser. No. 14/193,872, filed Feb. 28, 2014, entitled ELECTRIC POWER SYSTEM CONTROL WITH PLANNING OF ENERGY DEMAND AND ENERGY EFFICIENCY USING AMI-BASED DATA ANALYSIS, the entirety of each are herein incorporated by reference, describe improved control of an electric power system including planning the distribution circuits with respect to optimizing voltage, conserving energy, and reducing demand.

Electrical loads consume real power to perform work. Electrical power distribution and load systems may include inductive and/or capacitive loads that can temporarily store electrical power, which does not contribute to work. This stored power may be eventually returned to the electrical power distribution system as reactive power, often out of phase with the voltage, causing a difference between the current phase and the voltage phase. Volt-ampere reactive (VAR) is a unit of this reactive power. Other types of loads may also cause a shift in the current phase with respective to the voltage phase. The vector sum of the real power and the reactive power is the apparent power. The ratio of the real power to the apparent power is the power factor (PF) (dimensionless)

Capacitive loads generally cause the system current phase to be ahead ("lead") the system voltage phase. Inductive loads generally cause the system current phase to be behind ("lag") the system voltage phase. Thus, when accounting for the phase angle, power factor can be expressed as a number less than or equal to 1, and as either lagging or leading. The power factor decreases as the system becomes more lagging or more leading.

Poor system performance can occur when an electrical system is drawing too many VARs (i.e., the system is lagging too much), or when a system is generating too many VARs (i.e., the system is leading too much). By drawing or generating too many VARs, the magnitude of the vector sum of the real power the reactive power increases. Adding and/or subtracting capacitive or inductive loads can correct a leading or lagging power factor by counteracting the effects of other capacitive or inductive loads and thus decreasing the amount of reactive power in a system. As the magnitude of reactive power decreases, the ratio of real power to the apparent power increases (and thus the power factor approaches 1). However, the known devices designed to control power factor add and/or subtract loads independently, and only take into account local conditions. Therefore, by correcting to local VAR conditions, a system may be corrected too far in the opposite direction or add and/or subtract loads that are not optimal.

SUMMARY

The present disclosure relates to a method, an apparatus, a system and a computer program for optimizing and controlling volt-amperes reactive (VAR), or power factor, on an electrical distribution system.

In various configurations of the invention system electrical conditions are determined. In one aspect of the invention the system electrical conditions are determined from at least one electrical generation source. In another aspect of the invention, system electrical conditions are determined for an electrical grid. In another aspect of the invention, system electrical conditions are determined for a plurality of nodes. In yet another aspect of the invention system electrical conditions are determined for a plurality of transformers. In yet another aspect of the invention, system electrical conditions are determined for a plurality of users. In another aspect of the invention, system electrical conditions are determined for a plurality of meters and/or sensors.

In one aspect of the invention a power factor and/or VAR is determined for an electrical system. In another aspect of the invention, a power factor and/or VAR is determined at a plurality of geographical or electrical locations including a system power factor. In another aspect of the invention, the system power factor is determined at a single geographical or electrical location, for example a supply point. In one aspect of the invention, a supply point can be any location upstream from an end user, for example a power generating station 110, or a local branch or a substation 530. In another aspect of the invention, a system power factor or VAR is determined based on the electrical conditions at a plurality of geographical or electrical locations. In yet another aspect of the invention, electrical conditions, for example power factor or VARs, are determined based on measurements at available nodes. In yet another aspect of the invention, electrical conditions are determined based on measurements at substantially all available nodes.

In one aspect of the invention, at least one VAR adjustor is closed or opened (added, subtracted, or adjusted) when the system needs VAR support or has excess VARs. In another aspect of the invention, the invention is configured to seek unity power factor. In another aspect of the invention, a particular VAR adjuster is added, subtracted, adjusted, or not affected based on electrical conditions outside the direct area of influence of the VAR adjuster. For example, a particular VAR adjuster may influence electrical conditions throughout any system, but its practical effect in one aspect of the invention is limited to a particular direct area, for example the same node or the electrical area downstream of the same transformer where the VAR adjuster is electrically located. In another aspect of the invention, a particular VAR adjuster is closed, opened, or adjusted (or not affected) based on electrical conditions determined based on electrical conditions at a different node. In one particular example, a capacitor bank is closed or opened based on system level conditions.

In one aspect of the invention, electrical system subsets, for example nodes containing VAR adjustors, are prioritized. In one configuration, electrical system subsets are prioritized based on electrical system level conditions. In one configuration, for example, for a system having a lagging system power factor, lagging nodes are prioritized from most lagging to least lagging and then leading nodes are prioritized from least leading to most leading. In another aspect, for example in a system having a leading system power factor, leading nodes are prioritized from most leading to least leading and then lagging nodes are prioritized from least lagging to most lagging. In another aspect of the invention nodes are prioritized based on local measurements. In another aspect of the invention, VAR adjusters (for example, capacitor banks) within a node, are prioritized. In yet another aspect of the invention, nodes are prioritized by their local measurements to ensure that all actions taken to address system-level concerns are applied at the location where they are also most useful for local-level concerns. In resolving system level PF concerns (i.e., to adjust the system PF closer to 1), in one configuration a leading node may be adjusted to be more leading or a lagging node may be adjusted to be more lagging even though local conditions may imply the opposite shift is warranted.

In one aspect of the invention, system electrical conditions are used to determine one of a plurality of modes in which to operate. In one example, the method of determining whether to open or close any particular VAR adjuster is different for each mode. In another aspect of the invention, the determination of whether a particular VAR adjuster is closed, opened, or adjusted (or not affected) in one operating mode is configured to give more weight to system-level measurements than local measurements. In another aspect of the invention, the determination of whether a particular VAR adjuster is closed, opened, or adjusted (or not affected) in one operating mode is configured to give more weight to local-level measurements than system-level measurements. In another aspect of the invention, a plurality of modes are configured to be responsive to severe system-level operating conditions when warranted, and otherwise allow local conditions to dominate.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
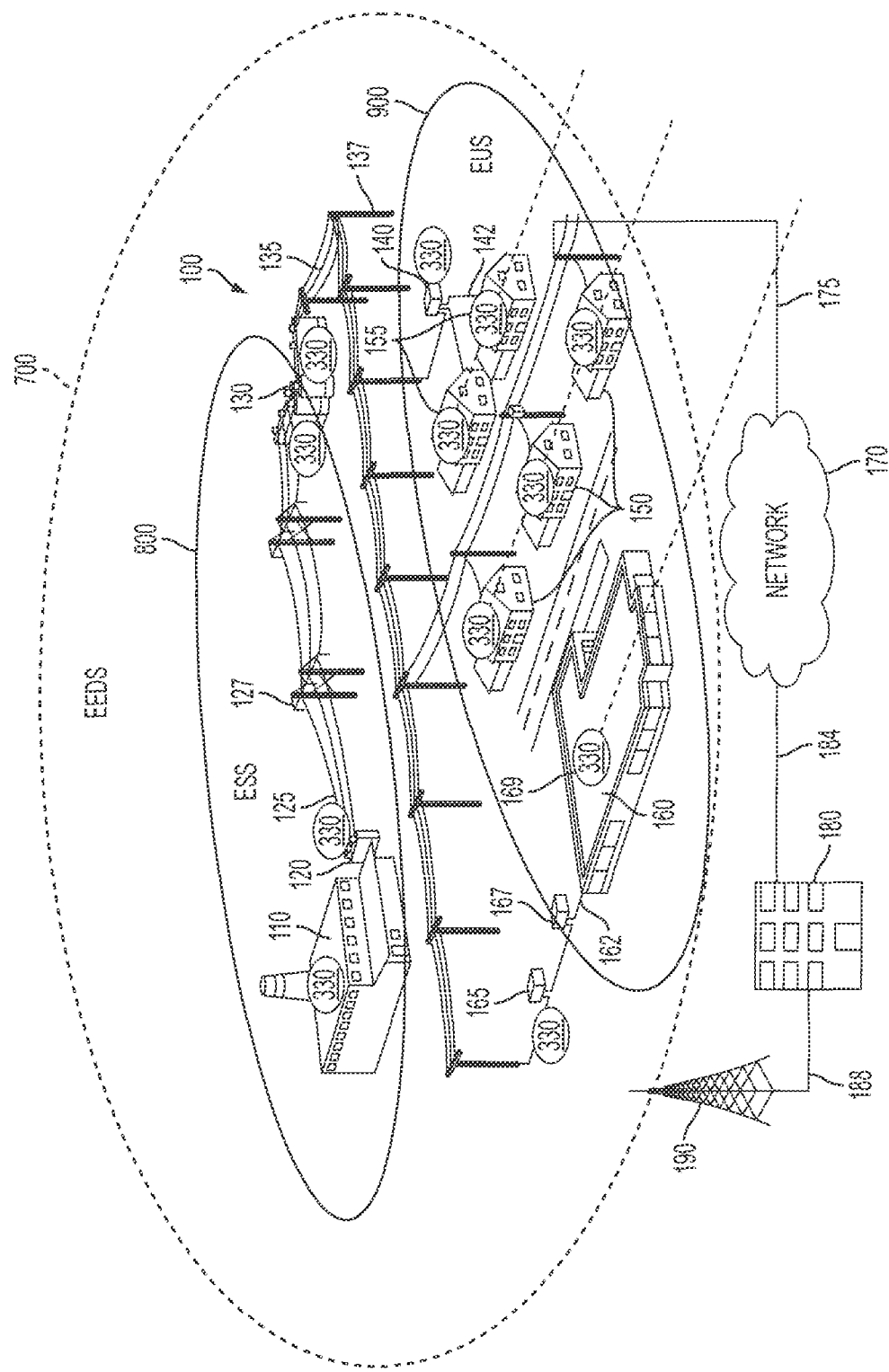
FIG. 1 shows an example of an EEDS made up of an electricity generation and distribution system connected to customer loads, according to principles of the disclosure.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

FIG. 1 is similar to FIG. 1 of US publication 2013/0030591 with overlays that show an example of an electric energy delivery system (EEDS) 700, including an energy supply system (ESS) 800, an energy usage system (EUS) 900 and an electrical energy distribution connection system (EEDCS) system 1000 based on the electricity generation and distribution system 100, according to principles of the disclosure. The electricity generation and distribution system 100 includes an electrical power generating station 110, a generating step-up transformer 120, a substation 130, a plurality of step-down transformers 140, 165, 167, and users 150, 160. The electrical power generating station 110 generates electrical power that is supplied to the step-up transformer 120. The step-up transformer steps-up the voltage of the electrical power and supplies the stepped-up electrical power to an electrical transmission media 125. The ESS 800 includes the station 110, the step-up transformer 120, the substation 130, the step-down transformers 140, 165, 167, the ER 500 as described herein, and the electrical transmission media, including media 125, for transmitting the power from the station 110 to users 150, 160. The EUS 900 includes an energy delivery system (EDS) 300 as described herein, and a number of energy usage devices (EUD) 920 that may be consumers of power, or loads, including customer equipment and the like. The EEDCS system 1000 includes transmission media, including media 135, connections and any other equipment located between the ESS 800 and the EUS 900.

As seen in FIG. 1, the electrical transmission media may include wire conductors, which may be carried above ground by, for example, utility poles 127, 137 and/or underground by, for example, shielded conductors (not shown). The electrical power is supplied from the step-up transformer 120 to the substation 130 as electrical power $E_{In}(t)$, where the electrical power $E_{In}$, in Mega Watts (MW) may vary as a function of time t. The substation 130, through the use of a transformer, converts the received electrical power $E_{In}(t)$ to $E_{Supply}(t)$ and supplies the converted electrical power $E_{Supply}(t)$ to the plurality of users 150, 160. The substation 130, via a transformer, may adjustably transform the voltage component $V_{In}(t)$ of the received electrical power $E_{In}(t)$ by, for example, stepping-down the voltage before supplying the electrical power $E_{Supply}(t)$ to the users 150, 160. The electrical power $E_{Supply}(t)$ supplied from the substation 130 may be received by the step-down transformers 140, 165, 167 and supplied to the users 150, 160 through a transmission medium 142, 162, such as, for example, but not limited to, underground electrical conductors (and/or above ground electrical conductors).

The EEDS 700 may include a variety of sensors 330 at various locations throughout the distribution system. For example, each of the users 150, 160 may include a sensor 330, as well as substation 130, which may include both upstream and downstream sensors. The sensors 330 may be coupled to a Regional Operations Center (ROC) 180. The ROC 180 may be coupled to the sensors 330, by means of a plurality of communication links 175, 184, 188, a network 170 and/or a wireless communication system 190. The wireless communication system 190 may include, but is not limited to, for example, an RF transceiver, a satellite transceiver, and/or the like.

The network 170 may include, for example, at least one of the Internet, a local area network (LAN), a wide area network (WAN), a metropolitan area network (MAN), a personal area network (PAN), a campus area network, a corporate area network, a serial data network, the electrical transmission media 125, 135 and transformers 140, 165, 167, a global area network (GAN), a broadband area network (BAN), or the like, any of which may be configured to communicate data via a wireless and/or a wired communication medium. The network 170 may be configured to include a network topology such as, for example, direct, a ring, a mesh, a line, a tree, a star, a bus, a full connection, or the like.

The sensors 330 may include any one or more of the following: A smart meter; an Advanced Meter Infrastructure (AMI); a current transformer (CT); a potential transformer (PT), a network interface (for example, a WAN interface, or the like); firmware; software; hardware; and the like. The sensor may be configured to determine any one or more of the following components of electrical power: kilo-Watthours (kWh) delivered; kWh received; kWh delivered plus kWh received; kWh delivered minus kWh received; interval data; demand data; power (W); voltage (V); current (I); phase (φ); VAR, PF and the like. If the sensor is a multi-phase meter, then the values for each phase may be used independently or combined, where appropriate.

The sensors 330 may further include one or more collectors 350 (shown in FIG. 2) configured to collect sensor data from one or more sensors 330 tasked with, for example, measuring and reporting electric power delivery and consumption at one or more locations. For example, a collector may be a remote terminal unit. Alternatively (or additionally), the one or more collectors may be located external to a substation 530, node, or the users 150, 160, such as, for example, in a housing holding the step-down transformers 140, 165, 167 or other location. Each of the collectors may be configured to communicate with the ROC 180.

VAROCS 200

Figure 2:
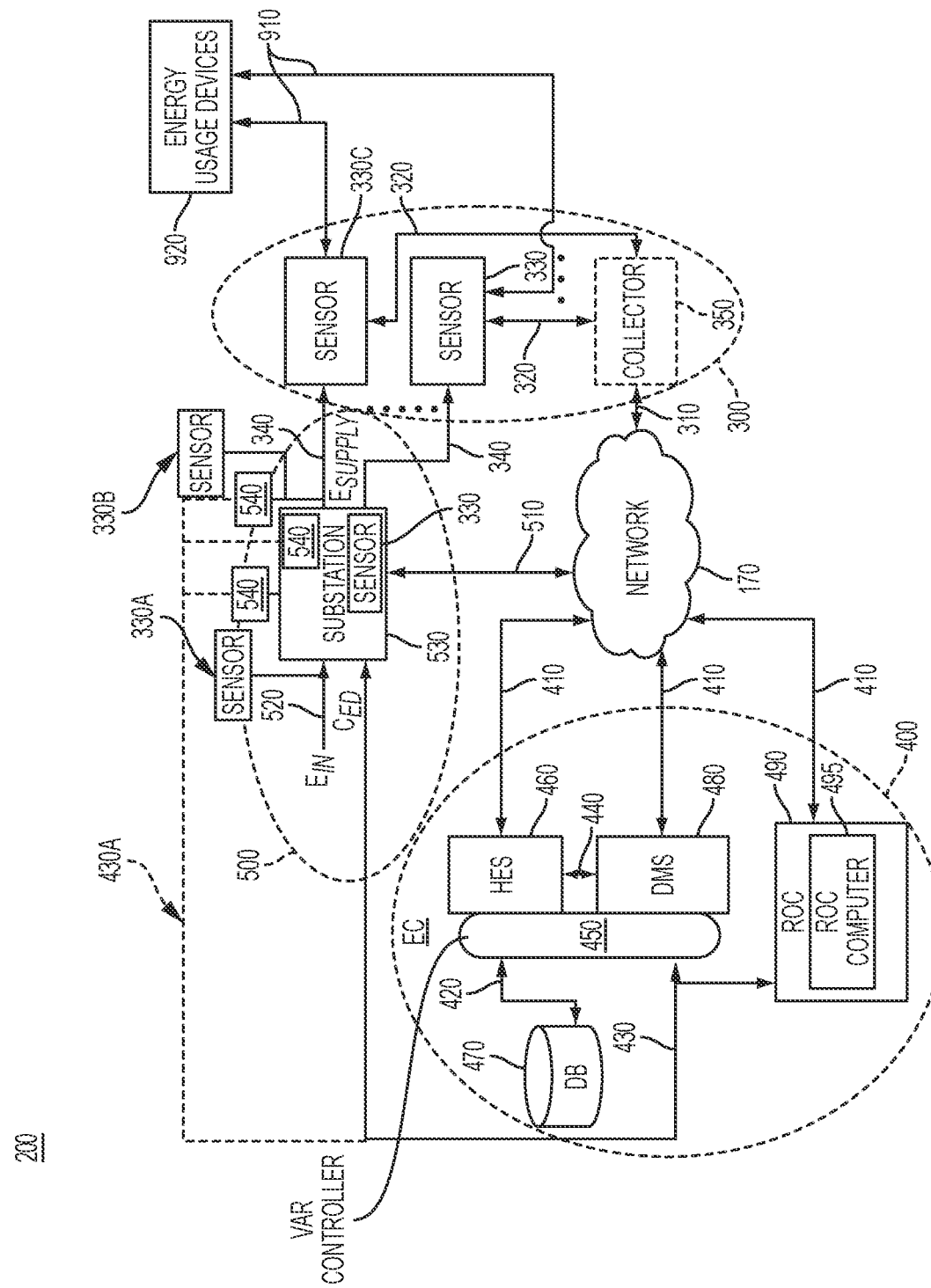
FIG. 2 shows an example of a VAR optimization and controls system (VAROCS), according to the principles of the disclosure.

According to one non-limiting example of the disclosure, VAR optimization and control system (VAROCS) 200 is provided (shown in FIG. 2). The VAROCS 200, may include several sub subsystems, including an energy delivery system (EDS) 300, an energy control system (ECS) 400, and/or an energy regulation system (ERS) 500. The VAROCS 200 is configured to monitor VAR and/or power factor at a plurality of distribution locations, for example at a power generating station 110, a substation 530 within the ERS 500, within the EDS 300, or at any other geographic or electrical location within the EEDS 700 and determine one or more energy delivery parameters at the ECS 400 (or VAR controller 450). The ECS 400 may then provide the one or more energy delivery parameters $C_{ED}$ to the ERS 500 to adjust lagging and/or leading loads for optimal VAR operation. The ECS 400 may also use information received from other voltage control systems to control the EEDS 700 in other ways. For example, components of the EEDS 700 may be modified, adjusted, added or deleted, including the modification of voltage regulators, changes to end-user equipment to modify customer efficiency, and other control actions.

The VAROCS 200 may be integrated into, for example, an existing electrical power supply control system, including load curtailment plans and voltage conservation systems. For example, portions of the VAROCS 200 system may reside as software modules on systems configured to also perform voltage conservation or other power control functions and share components or software modules as practical. The VAROCS 200 may be configured to yield to the control of other voltage and/or system level controllers, for example, when one or more predetermined events are triggered.

As discussed above, in one example, the VAROCS 200 can include the EDS 300, the ECS 400 and the ERS 500, each of which is shown as a broken-line ellipse. The VAROCS 200 is configured to monitor a component of electrical power at any location within EDS 700, for example within the EDS 300 and/or ERS 500. The VAROCS 200 can monitor a component of electrical power at one or more locations, for example VAR adjuster 540, any of sensors 300, i.e., sensors 330A, 330B, or 330C, and/or users 150, 160 (shown in FIG. 1) and send energy information to the ECS 400. The ECS 400 processes the at least one component of electrical power information and generates one or more energy delivery parameters $C_{ED}$, which it sends to the ERS 500 via communication link 430. The ERS 500 receives the one or more energy delivery parameters $C_{ED}$ and adjusts the one or more VAR adjusters 540 based on the energy delivery parameters $C_{ED}$.

The VAROCS 200 may include a closed loop process control application that uses data provided by the EDS 300 and/or ERS 500 to control, for example, at least one VAR adjuster 540 within the ERS 500.

The ECS 400 may send control signals as energy delivery parameters $C_{ED}$, or any other form of control signal, to the VAR adjusters 540. For example, control signals (i.e., $C_{ED}$) may be sent to a substation 530 via communications link 430 and include other energy control parameters, for example voltage set-points. In another example, control signals may be sent via communications link 430 directly to the VAR adjuster 540 via a wired or wireless connection.

ERS 500

The ERS 500 may communicate with the EDS 300 and/or ECS 400 by means of the network 170. The ERS 500 is coupled to the network 170 and the ECS 400 by means of communication links 510 and 430, respectively. The ECS 500 is also coupled to the EDS 300 by means of the power lines 340, which may include communication links.

The ERS 500 includes a substation 530 which receives the electrical power supply $E_{In}(t)$ from, for example, the power generating station 110 (shown in FIG. 1) on a line 520. The electrical power $E_{In}(t)$ includes a voltage $V_{In}(t)$ component and a current $I_{In}(t)$ component. The substation 530 adjustably transforms, via a transformer, the received electrical power $E_{In}(t)$ to, for example, reduce (or step-down) the voltage component $V_{In}(t)$ of the electrical power $E_{In}(t)$ to a voltage value $V_{Supply}(t)$ of the electrical power $E_{Supply}(t)$ supplied to the plurality of sensors 330 on the power supply lines 340.

The substation 530 may include a transformer (not shown), such as, for example, a load tap change (LTC) transformer. In this regard, the substation 530 may further include an automatic tap changer mechanism (not shown), which is configured to automatically change the taps on the LTC transformer. The tap changer mechanism may change the taps on the LTC transformer either on-load (on-load tap changer, or OLTC) or off-load, or both. The tap changer mechanism may be motor driven and computer controlled.

The ERS 500 may also include any number of VAR adjusters 540. VAR adjuster 540 may be located at substation 530 or in another location separate from substation 530. ERS 500 may include multiple nodes. A node can include the portion of the EEDS 700 under the influence of a VAR adjuster 540. For example, if several VAR adjusters can influence a portion of the EEDS 700, those VAR adjusters 540 can be grouped into a node. A node can include all of the locations or users downstream of a transformer, for example downstream of a substation 530. Multiple VAR adjusters 540 can be grouped together in a node such that at least one component of electrical power can be determined for the node. In one example, a node may include only VAR adjusters downstream of a single transformer. For example, a node may include one transformer and multiple VAR adjusters 540 downstream of the transformer. A node may also include all locations and sensors downstream of a single transformer. In another aspect, a node may be made up of several sub-nodes, whereby a single transformer has several downstream VAR adjustors 540 that are each controlled individually as nodes.

VAR adjuster 540 may be any electrical power device configured to adjust the VAR in the system. For example, a capacitor and/or an inductor and/or a synchronous condenser bank consisting of any number or type of capacitors and/or inductors and/or synchronous condensers configured to add or subtract reactive power. For example, VAR adjuster 540 may be a load bank of capacitors that when closed (i.e., added) to the ERS 500, it serves to supply reactive power and bring a lagging power factor closer to unity (i.e., 1). Similarly, if the power factor is leading, opening (i.e., subtracting) the load bank of capacitors from the ERS 500 causes the VAR adjuster 540 to stop supplying reactive power and is configured to bring a leading power factor closer to unity.

In another example, VAR adjuster 540 may be a load bank of inductors. Because inductors generally consume reactive power instead of supplying it, the effect on power factor and VAR would generally be the opposite of a capacitor bank.

Additionally (or alternatively), the substation 530 may include one or more voltage regulators, or other voltage controlling equipment, as known by those having ordinary skill in the art, that may be controlled to maintain the output the voltage component $V_{Supply}(t)$ of the electrical power $E_{Supply}(t)$ at a predetermined voltage value or within a predetermined range of voltage values.

The ERS 500 receives the energy delivery parameters $C_{ED}$ from the ECS 400 on the communication link 430, 430A, or any other path, wired or wireless. The energy delivery parameters $C_{ED}$ may include, for example, instructions to add (close) or subtract (open) VAR adjusters 540, as well as other instructions, for example load tap coefficients when an LTC transformer is used to step-down the input voltage component $V_{In}(t)$ of the electrical power $E_{In}(t)$ to the voltage component $V_{Supply}(t)$ of the electrical power $E_{Supply}(t)$ supplied to the EDS 300. The energy delivery parameters $C_{ED}$ can be configured to address the VAR adjusters 540 individually or in groups.

The at least one electrical power component, for example, voltage, current, phase angle, phase difference ($\rho_{In}(t)$), VAR, energy usage (MW) or power factor, may be monitored upstream (high-voltage) or downstream (low-voltage) of substation 530 or the LTC transformer by, for example, sampling or continuously measuring the electrical power component of the stepped-down electrical power $E_{Supply}(t)$ and storing the measured electrical power component values as a function of time t in a storage, such as, for example, a computer readable medium. The at least one electrical power component may be monitored at, for example, a power generating station 110, a substation distribution bus, at one or more VAR adjusters 540, any other location, or the like. Further, the electrical power component may be measured at any point where measurements could be made for the transmission or distribution systems in the ERS 500. The electrical power component may be measured by a sensor 330 or other sensors. For example, sensor 330 located at the substation, sensor 330A located upstream of substation 530 or sensor 330B near VAR adjuster 540B.

More than one component of electrical power can be measured at each location, for example, the voltage component $V_{Supply}(t)$ of the stepped-down electrical power $E_{Supply}(t)$ can be measured and monitored as well as the current component $I_{Supply}(t)$ of the stepped-down electrical power $E_{Supply}(t)$. In this regard, a phase difference $\varphi_{Supply}(t)$ between the voltage $V_{Supply}(t)$ and current $I_{Supply}(t)$ components of the electrical power $E_{Supply}(t)$ may be determined and monitored. The ERS 500 can provide the components of electrical power to the ECS 400 individually, for example $V_{Supply}(t)$ and current $I_{Supply}(t)$, or other components, for example $\varphi_{Supply}(t)$ or VAR, may be calculated prior to providing the component of electrical power to the ECS 400. The ERS 500 can provide the components of electrical power to the ECS 400 for a single location, i.e. for a node, by measuring directly at a substation 530, or by grouping multiple sensors and various locations within a node to provide a component of electrical power made up from a number of individual locations within the node.

The ERS 500 may provide the at least one component of electrical power information to the ECS 400 on the communication links 430 or 510. The ERS 500 can also supply status information for VAR adjustors 540.

The at least one component of electrical power may be provided to the ECS 400 at periodic intervals of time, such as, for example, every second, 5 sec., 10 sec., 30 sec., 60 sec., 120 sec., 600 sec., or any other value within the scope and spirit of the disclosure, as determined by one having ordinary skill in the art. The periodic intervals of time may be set by the ECS 400 or the ERS 500. Alternatively, the at least one component of electrical power may be provided to the ECS 400 or ERS 500 intermittently.

Further, the at least one component of electrical power may be forwarded to the ECS 400 in response to a request by the ECS 400, or when a predetermined event is detected. The predetermined event may include, for example, when a particular component, such as $VAR_{Supply}(t)$, $V_{Supply}(t)$, $I_{Supply}(t)$, $\varphi_{Supply}(t)$, or $PF_{Supply}(t)$ changes by an amount greater (or less) than a defined threshold value over a predetermined interval of time, a temperature of one or more components in the ERS 500 exceeds a defined temperature threshold, or the like.

EDS 300

The EDS 300 includes a plurality of sensors 330. The EDS 300 may further include at least one collector 350, which is optional. The EDS 300 may be coupled to the network 170 by means of a communication link 310. The collector 350 may be coupled to the plurality of sensors 330 by means of a communication link 320. The sensors 330 may be coupled to the ERS 500 by means of one or more power supply lines 340, which may also include communication links.

Each sensor 330 is configured to measure, store and report at least one component of electrical power at associated users 150, 160 (shown in FIG. 1), locations, or nodes throughout ESS 800, EEDCS 1000, or ESU 900. Each sensor 330 is further configured to measure and determine at least one component of electrical power as a function of time. The sensors 330 may measure the at least one component of electrical power at discrete times $t_s$, where s is a sampling period, such as, for example, s=5 sec., 10 sec., 30 sec., 60 sec., 300 sec., 600 sec., or more. For example, the sensors 330 may measure, for example, every minute ($t_{60\ sec}$), five minutes ($t_{300\ sec}$), ten minutes ($t_{600\ sec}$), fifteen minutes ($t_{900\ sec}$), or more, or at time intervals variably set by the sensor 330 (for example, using a random number generator).

The sensors 330 may average the measured component(s) of electrical power values over predetermined time intervals (for example, 5 min., 10 min., 30 min., or more). The sensors 330 may store the measured component(s) of electrical power as sensor data in a local (or remote) storage, such as, for example, a computer readable medium.

Each sensor 330 is also capable of operating in a "report-by-exception" mode for any particular component of electrical power that falls outside of a target band. The target component band may include a target power factor band, a target phase angle difference band, a target voltage band, a target current band, or a target energy usage band. In the "report-by-exception" mode, the sensor 330 may sua sponte initiate communication and send sensor data to the ECS 400. The "report-by-exception" mode may be used to reconfigure the sensors 330 used to represent the system conditions being monitored by the ECS 400.

The sensor data may be periodically provided to the collector 350 by means of the communication links 320. Additionally, the sensors 330 may provide the sensor data in response to a sensor data request signal received from the collector 350 on the communication links 320.

Alternatively (or additionally), the sensor data may be periodically provided directly to the ECS 400 (for example, the head-end server (HES) 460) from the plurality of sensors, by means of, for example, communication links 320, 410 and network 170. In this regard, the collector 350 may be bypassed, or eliminated from the EDS 300. Furthermore, the sensors 330 may provide the sensor data directly to the ECS 400 in response to a sensor data request signal received from the ECS 400. In the absence of the collector 350, the ECS (for example, the HES 460) may carry out the functionality of the collector 350 described herein.

The request signal may include, for example, a query (or read) signal and a sensor identification signal that identifies the particular sensor 330 from which sensor data is sought. The sensor data may include the following information for each sensor 330, including, for example, VAR data, power factor data, kilo-Watt-hours (kWh) delivered data, kWh received data, kWh delivered plus kWh received data, kWh delivered minus kWh received data, voltage level data, current level data, phase angle between voltage and current, kVAR data, time interval data, demand data, and the like.

Additionally, the sensors 330 may send the sensor data to the meter automation system server HES 460. The sensor data may be sent to the HES 460 periodically according to a predetermined schedule or upon request from the HES 460.

The collector 350 is configured to receive the sensor data from each of the plurality of sensors 330 via the communication links 320. The collector 350 stores the received sensor data in a local storage, such as, for example, a computer readable medium (e.g., a non-transitory computer readable medium). The collector 350 compiles the received sensor data into a collector data. In this regard, the received sensor data may be aggregated into the collector data based on, for example, a node, a geographic zone in which the sensors 330 are located, a particular time band (or range) during which the sensor data was collected, a subset of sensors 330 identified in a collector control signal, and the like. In compiling the received sensor data, the collector 350 may average the voltage component $V_{Meter}(t)$ values received in the sensor data from all (or a subset of all) of the sensors 330.

The ECS 400 is able to select or alter a subset of all of the sensors 330 to be monitored for predetermined time intervals, which may include for example 15 minute intervals. It is noted that the predetermined time intervals may be shorter or longer than 15 minutes. The subset of all of the sensors 330 is selectable and can be altered by the ECS 400 as needed.

The collector 350 may also average the component of electoral power values received in the sensor data from all (or a subset of all) of the sensors 330. The compiled collector data may be provided by the collector 350 to the ECS 400 by means of the communication link 310 and network 170. For example, the collector 350 may send the compiled collector data to the HES 460 (or ROC 490) in the ECS 400.

The collector 350 is configured to receive collector control signals over the network 170 and communication link 310 from the ECS 400. Based on the received collector control signals, the collector 350 is further configured to select particular ones of the plurality of sensors 330 and query the sensor data by sending a sensor data request signal to the selected sensors 330. The collector 350 may then collect the sensor data that it receives from the selected sensors 330 in response to the queries. The selectable sensors 330 may include any one or more of the plurality of sensors 330. The collector control signals may include, for example, an identification of the sensors 330 to be queried (or read), time(s) at which the identified sensors 330 are to measure the $V_{Meter}(t)$, $I_{Meter}(t)$, $E_{Meter}(t)$, $\varphi_{Meter}(t)$, $VAR_{Meter}(t)$, $PF_{Meter}(t)$, energy usage information since the last reading from the identified sensor 330, and the like. The collector 350 may then compile and send the compiled collector data to the HES 460 (and/or ROC 490) in the ECS 400.

ECS 400

The ECS 400 may communicate with the EDS 300 and/or ERS 500 by means of the network 170. The ECS 400 is coupled to the network 170 by means of one or more communication links 410. The ECS 400 may also communicate directly with the ERS 500 by means of a communication link 430.

The ECS 400 includes the HES 460, a database (DB) 470, a distribution management system (DMS) 480, and a regional operation center (ROC) 490. The ROC 490 may include a computer (ROC computer) 495, a server (not shown) and a database (not shown). The HES 460 may be coupled to the DB 470 and DMS 480 by means of communication links 420 and 440, respectively. The DMS 480 may be coupled to the ROC 490 and ERS 500 by means of the communication link 430. The database 470 may be located at the same location as (for example, proximate to, or within) the HES 460, or at a remote location that may be accessible via, for example, the network 170.

The HES 460 may include a computer (not shown) that is configured to receive the collector data from the collector 350, which includes sensor data collected from a selected subset (or all) of the sensors 330. The HES 460 is further configured to retrieve and forward sensor data to the ROC 490 in response to queries received from the ROC 490. The HES 460 may store the collector data, including sensor data in a local storage and/or in the DB 470.

The DMS 480 may include a computer that is configured to receive the component of electrical power status information from the substation 530. The DMS 480 is further configured to retrieve and forward measured electrical power component values in response to queries received from the ROC 490. The DMS 480 also may be further configured to retrieve all "report-by-exception" components of electrical power from the sensors 330 operating in the "report-by-exception" mode and designate a sensor 330 as one of the control points to be continuously read at predetermined times (for example, every 15 minutes, or less (or more), or at varying times). The "report-by-exception components may be used to control the EC 500 set points.

The DB 470 may include a plurality of relational databases (not shown). The DB 470 includes a large number of records that include historical data for each sensor 330, each collector 350, each substation 530, and the geographic area(s) (including latitude, longitude, and altitude) where the sensors 330, collectors 350, and substations 530 are located. As well as other information related to VAR optimization and control as will be discussed further below.

The DB 470 may include any one or more of the following information for each sensor 330, including: a geographic location (including latitude, longitude, and altitude); a sensor identification number; an account number; an account name; a billing address; a telephone number; a sensor type, including model and serial number; a date when the sensor was first placed into use; a time stamp of when the sensor was last read (or queried); the sensor data received at the time of the last reading; a schedule of when the sensor is to be read (or queried), including the types of information that are to be read; and the like.

The historical sensor data may include, for example, any component of electrical power, for example $V_{Meter}(t)$, $PF_{Meter}(t)$, $I_{Meter}(t)$, $MW_{Meter}(t)$, $VAR_{Meter}(t)$ and/or $\varphi_{Meter}(t)$ as a function of time. Time t may be measured in, for example, discrete intervals at which the component of electrical power is measured or determined at the sensor 330. Given the low cost of memory, the DB 470 may include historical data from the very beginning of when the sensor data was first collected from the sensors 330 through to the most recent sensor data received from the sensors 330.

The DB 470 may include a time value associated with each measured component of electrical power, which may include a timestamp value generated at the sensor 330. The timestamp value may include, for example, a year, a month, a day, an hour, a minute, a second, and a fraction of a second. Alternatively, the timestamp may be a coded value which may be decoded to determine a year, a month, a day, an hour, a minute, a second, and a fraction of a second, using, for example, a look up table. The ROC 490 and/or sensors 330 may be configured to receive, for example, a WWVB atomic clock signal transmitted by the U.S. National Institute of Standards and Technology (NIST), or the like and synchronize its internal clock (not shown) to the WWVB atomic clock signal.

The historical data in the DB 470 may further include historical collector data associated with each collector 350. The historical collector data may include any one or more of the following information, including, for example: the particular sensors 330 associated with each collector 350; the geographic location (including latitude, longitude, and altitude) of each collector 350; a collector type, including model and serial number; a date when the collector 350 was first placed into use; a time stamp of when collector data was last received from the collector 350; the collector data that was received; a schedule of when the collector 350 is expected to send collector data, including the types of information that are to be sent; and the like.

The historical collector data may further include, for example, an external temperature value $T_{Collector}(t)$ measured outside of each collector 350 at time t. The historical collector data may further include, for example, any one or more of the following for each collector 350: an atmospheric pressure value $P_{Collector}(t)$ measured proximate the collector 350 at time t; a humidity value $H_{Collector}(t)$ measured proximate the collector 350 at time t; a wind vector value $W_{Collector}(t)$ measured proximate the collector 350 at time t, including direction and magnitude of the measured wind; a solar irradiant value $L_{Collector}(t)$ (kW/m$^2$) measured proximate the collector 350 at time t; and the like.

The DB 470 may further include sensor, VAR adjustor, and substation data associated with various system components throughout EEDS 700. The data may include any one or more of the following information, including, for example: the identifications of the particular sensors 330 supplied by the substation 530; the identification of VAR adjusters 540 associated with the particular sensors; the geographic location (including latitude, longitude, and altitude) of the substation 530, sensors 330, and VAR adjusters 540; the VAR adjuster 540 type, including model, serial number, capacitive value, inductor value; VAR rating; a history of the open and/or shut cycles of any particular VAR adjuster 540, the number of times a particular VAR adjuster has been opened or shut in its service lifetime or during a particular time period; the number of distribution circuits; the number of transformers; a transformer type of each transformer, including model, serial number and maximum Megavolt Ampere (MVA) rating; the number of voltage regulators; a voltage regulator type of each voltage regulator, including model and serial number; a time stamp of when substation data was last received from the substation 530; the substation data that was received; a schedule of when the substation 530 is expected to provide electrical energy supply status information, including the types of information that are to be provided; and the like.

The historical substation data may include, for example, at least one component of electrical power supplied to each particular sensor 330, and measured or determined at the input or output of the substation 530.

In the VAROCS 200, control may be initiated from, for example, the ROC computer 495. In this regard, a control screen 305 may be displayed on the ROC computer 495, as shown, for example, in FIG. 3 of the US 2013/0030591 publication. The control screen 305 may correspond to data for a particular substation 530 (for example, the TRABUE SUBSTATION) in the ERS 500. The ROC computer 495 can control and override (if necessary), for example, the VAR adjuster 540 status based on, for example, the sensor data received from the ERS 500 or EDS 300 for the users 150, 160.

For system security, the substation 530 may be controlled through the direct communication link 430 from the ROC 490 and/or DMS 480, including transmission of data through communication link 430 to and from the ER 500, EUS 300 and EVP 600.

Furthermore, an operator can initiate a VAR adjuster control program on the ROC computer 490, overriding the controls, if necessary, and monitoring a time it takes to read the component of electrical power being used for control of, for example, the VAR adjuster 540 in the ERS 500.

Figure 3:
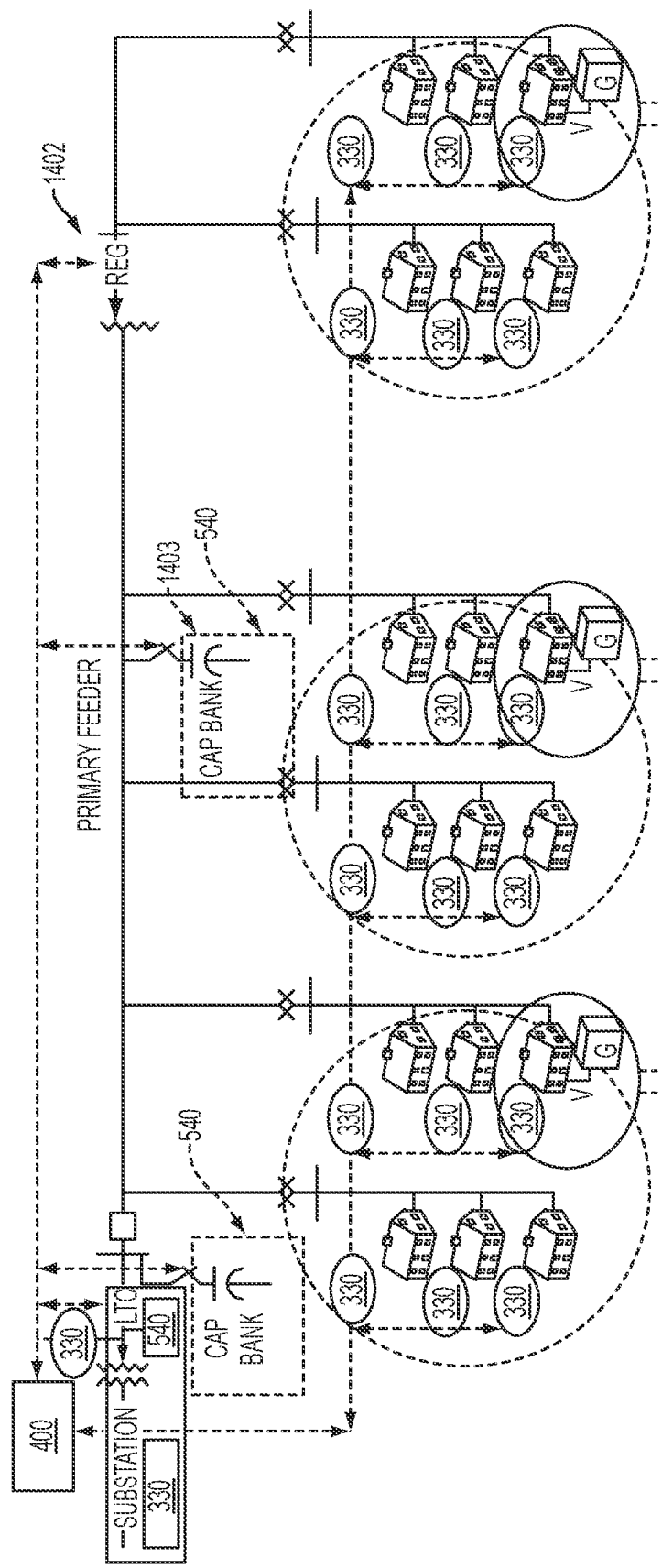
FIG. 3 shows an example portion of the EEDS, according to principles of the disclosure.

FIG. 3 shows an example of a node including sensors and VAR adjusters 540 downstream of substation 530.

VAR Optimization and Control

ECS 400 includes VAR controller 450 configured to optimize and affect the system VAR and the power factor automatically without operator control. However, VAR controller 450 can also be configured to receive manual input from an operator to affect other operations, such as opening or closing VAR adjusters 540 manually. VAR controller 450 can be located functionally at any location within with ECS 400 so as to affect the optimization described herein and should not be limited by the functional location as shown in FIG. 2. One or more energy delivery parameters $C_{ED}$ are generated by the VAR controller 450 to configure one more VAR adjustors 540 based on the VAR requirements of EEDS 700. As described above, at least one measured component of electrical power measured in the EEDS 700, or for example the ERS 500 and/or EDS 300 from one or a plurality of locations and/or nodes are sent to or received by the ECS 400 and are accessible by the VAR controller. From the at least one measured component of electrical power, VAR controller 450 is configured to determine a system power factor. If optimization or adjustment to the system power factor is needed, VAR controller 450 is further configured to generate one or more energy delivery parameters $C_{ED}$ to configure one or more VAR adjustors 540 (i.e., add, subtract, or adjust VAR) according to one or more modes of operations.

VAR controller 450 can operate in one or more modes of operation. In a single (or one-mode) operation, the VAR controller only uses one method to determine the order of VAR adjuster(s) 450 to adjust (i.e., add, subtract, or adjust VAR) in order to correct the power factor. VAR controller 450 can also be configured to operate in multiple modes of operations. The mode of operation can automatically be determined based on the system power factor. For example, in a two-mode configuration, a first mode may be used if the system power factor is below a first set-point and a second mode may be used if the system power factor is above the first set-point. VAR controller 450 may be configured with any number of modes. The number of set points would be n−1, where n is the number of modes.

A non-limiting five mode VAR controller 450 example will be described with respect to FIGS. 4 and 5. However, VAR controller 450 may operate in any number of modes, for example, one-mode, two modes, three modes, four modes, five modes, six modes, seven modes, or more. Each individual mode of operation may be run independently.

In a five-mode VAR controller 450, the VAR controller can be configured with four power factor set-points. These set-points can be pre-determined and can also be changed according to desired system control or operation. The four set-points could be, for example, an emergency lagging PF set point (EMER_LAG_PF), a lagging PF set point (LAG_PF), a leading PF set point (LEAD_PF), and an emergency leading PF set point (EMER_LEAD_PF). The set point names represent a defined power factor and thus can be named according to a particular system configuration.

In the example five-mode VAR controller 450, mode 1 (M1) can be an EMERGENCY LAG mode and the VAR controller 450 will operate in M1:EMERGENCY LAG when the system PF is lagging and is less than or equal to EMER_LAG_PF. Mode 2 (M2) can be a LAG mode and the VAR controller 450 will operate in M2:LAG when the system PF is lagging and is greater than EMER_LAG_PF and less than or equal to LAG_PF. Mode 3 (M3) can be a TARGET mode and the VAR controller 450 will operate in M3:TARGET when the system PF is lagging and is greater than LAG_PF and less than or equal to 1 or when the system PF is leading and is greater than LEAD_PF and less than 1. Mode 4 (M4) can be a LEAD mode and the VAR controller 450 will operate in M4: LEAD when the system PF is leading and is less than or equal to LEAD_PF and greater than EMER_LEAD_PF. Mode 5 (M5) can be an EMERGENCY LEAD mode and the VAR controller 450 will operate in M5:EMERGENCY LEAD when the system PF is leading and is less than or equal to EMER_LEAD_PF.

Figure 4:
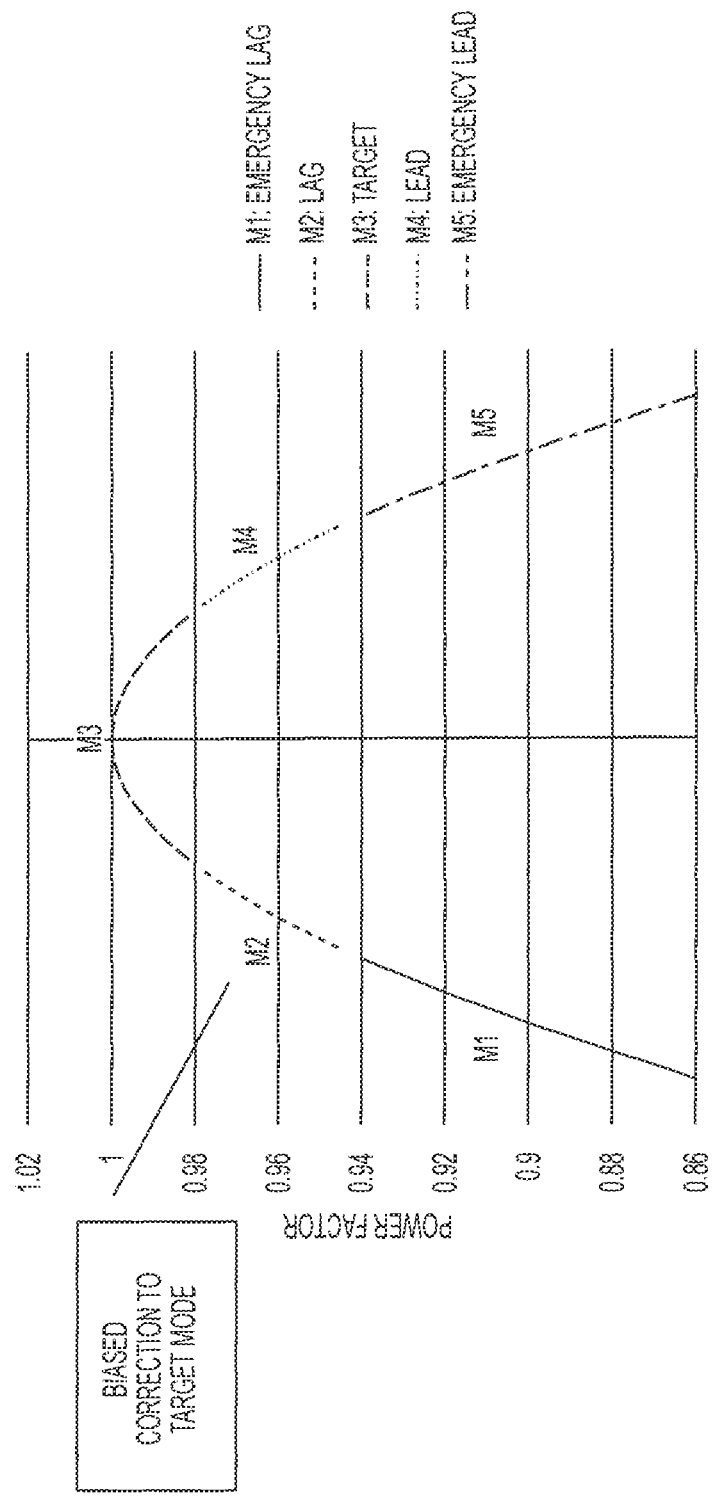
FIG. 4 shows example modes of operation, according to principles of the disclosure.
Figure 5:
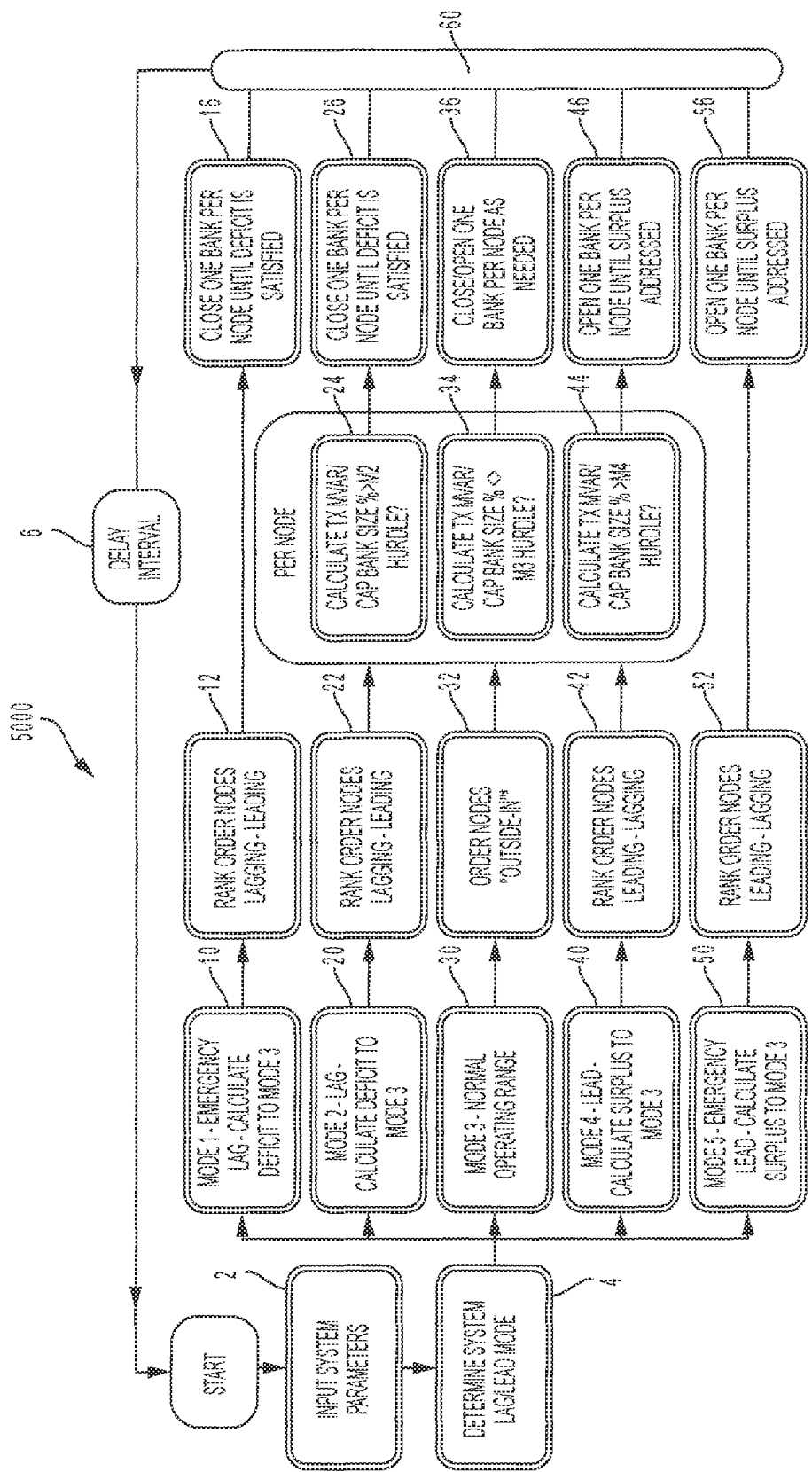
FIG. 5 shows example methods of operation, according to principles of the disclosure.

FIG. 4 shows example operating modes 1 through 5. Although the magnitudes of EMER_LAG_PF and LAG_PF are shown as being equal in magnitude to EMER_LEAD_PF and LEAD_PF, respectively, there is no requirement that they must be equal.

Each mode will be discussed in greater detail with respect to FIG. 5. The method 5000 of operation of the five-mode VAR controller 450 begins with the input of the system parameters at step 2, for example a measured component of electrical power from more than one location, i.e. a supply point and/or a plurality of distribution location, or a calculated parameter based on sensor 330 or other sensor measurements. As discussed previously, the component of electrical power can be, for example, voltage, current, phase angle, phase angle difference, VAR, power factor, or the like as discussed throughout this disclosure. At step 4, the VAR controller 450 determines the system PF, whether it is lagging or leading, and other optional components of electrical power such as the system mega VAR (MVAR) and system MW.

Mode 1

If the system PF determined at step 4 is lagging and is less than or equal to EMER_LAG_PF, the VAR controller 450 will operate in M1 and calculate at step 10 a TARGET CLOSE MVAR. As just one example, the TARGET CLOSE MVAR can be calculated as in Eqn. [1].

$$\text{TARGET CLOSE MVAR} = \text{System MVAR} - (\text{System MW} \cdot \tan(\cos^{-1}(\text{LAG\_PF}))) \quad [1]$$

At step 12, VAR controller 450 orders (i.e., sorts) all nodes. First, all lagging nodes from most lagging to least lagging (i.e., by ascending power factor) and then all leading nodes from least leading to most leading (i.e., by descending power factor). At step 16, for each node in the order determined at step 12, VAR controller 450 causes the closure of one VAR adjustor 540 per node, for example by generating one or more energy delivery parameters $C_{ED}$. After each closure, VAR controller 450 adds the closed MVAR for the VAR adjuster 540 to a TOTAL CLOSED MVAR (the TOTAL CLOSED MVAR starts at zero for each repetition of the method) and determines if the TOTAL CLOSED MVAR exceeds the TARGET CLOSE MVAR determined at step 10. If the TOTAL CLOSED MVAR exceeds the TARGET CLOSE MVAR, then the VAR controller exits step 16. If it does not, then the VAR controller 450 causes the closure of the VAR adjuster in the next node. If a VAR adjuster 540 has been closed in every node during step 16 and the TOTAL CLOSED MVAR does not exceed the TARGET CLOSE MVAR, no further nodes are adjusted until after an interval delay discussed below with reference to step 6.

In one configuration, the VAR controller 450 does not actually cause the closure of VAR adjusters 540 at step 16, but instead determines all of the VAR adjusters 540 to be closed according to the mode instruction. After all of the determinations are made, the execution commands to all nodes requiring action are sent at step 60. Step 60 is available to all modes discussed herein, but will not be discussed with the remaining modes.

After step 16, an interval delay occurs at step 6 before the method is repeated at step 2. The interval delay may be any value found to provide adequate control while balancing system resources and minimizing the effects of transients on the system. In one example 5 minutes is an optimal interval delay. In another example any interval between 4 and 6 minutes or between 1 and 10 minutes is an optimal interval. And in yet another example, the interval delay is limited only by the run speed of the software module. The goal of M1 is to close enough VAR adjusters 540 to get into Target mode, i.e., operating with a PF close to 1, or in this example, getting into M3.

Mode 2

If the system PF determined at step 4 is lagging and is greater than EMER_LAG_PF and less than LAG_PF, the VAR controller 450 will operate in M2 and calculate at step 20 a TARGET CLOSE MVAR. As just one example, the TARGET CLOSE MVAR can be calculated as in Eqn. [1].

At step 22, VAR controller 450 orders (i.e., sorts) all nodes. First, all lagging nodes from most lagging to least lagging (i.e., by ascending power factor) and then all leading nodes from least leading to most leading (i.e., by descending power factor). At step 24, for each node in the order determined at step 22, the VAR controller 450 determines a mode 2 percentage (M2%) as a ratio of the node MVAR divided by the MVAR rating of the VAR adjuster 540 to close At step 26, VAR controller 450 causes the closure of one VAR adjustor 540 if the M2% is greater than a mode 2 hurdle set point, for example, by generating one or more energy delivery parameters $C_{ED}$. The mode 2 hurdle set point can be, for example, the hurdle rate as a percentage to close VAR adjustors 540 and can be represented as PCT_CLOSE_LAG_MODE.

After each closure, VAR controller 450 adds the closed MVAR for the VAR adjuster 540 to a TOTAL CLOSED MVAR and determines if the TOTAL CLOSED MVAR exceeds the TARGET CLOSE MVAR determined at step 20. If the TOTAL CLOSED MVAR exceeds the TARGET CLOSE MVAR, then the VAR controller exits steps 24 and 26. If it does not, then the VAR controller 450 causes the closure of the VAR adjuster 540 in the next node and repeats the determination. However, if the mode 2 hurdle set point is greater than zero, the leading nodes will not be processed. If a VAR adjuster 540 has been closed in every node during step 16 and the TOTAL CLOSED MVAR does not exceed the TARGET CLOSE MVAR, no further nodes are adjusted until after an interval delay discussed below with reference to step 6. After step 26, an interval delay occurs at step 6 before the method is repeated at step 2. The goal of M2 is to close enough VAR adjusters 540 to go into Target mode but to include the M2% and thus the mode 2 hurdle set point configuration value as an additional factor.

Mode 3

If the system PF determined at step 4 is lagging and is greater than LAG_PF or leading and greater than LEAD_PF, the VAR controller 450 will operate in M3. At step 30, if the system PF is lagging the VAR controller 450 will calculate a TARGET CLOSE MVAR. As just one example, the TARGET CLOSE MVAR can be calculated as in Eqn. [2].

TARGET CLOSE MVAR=System MVAR+(System MW*tan(cos$^{-1}$(LEAD_PF)))      [2]

However, if the system PF is leading the VAR controller 450 will calculate a TARGET OPEN MVAR. As just one example, the TARGET OPENE MVAR can be calculated as in Eqn. [3].

TARGET OPEN MVAR=(-1)*System MVAR+(System MW*tan(cos$^{-1}$(LAG_PF)))      [3]

At step 32, VAR controller 450 orders (i.e., sorts) all lagging nodes from most lagging to least lagging (i.e., by ascending power factor) and sorts all leading nodes from most leading to least leading (i.e., by ascending power factor).

If the system PF is lagging, at step 34, for each lagging node in the order determined at step 32, the VAR controller 450 determines if the TOTAL CLOSED MVAR plus the MVAR of the next VAR adjustor 540 to close is greater than the TARGET CLOSE MVAR. If it is, then the loop over the lagging nodes ends. Otherwise, a mode 3 percentage close (M3C %) as a ratio of the node MVAR divided by the MVAR rating of the VAR adjuster 540 to close. At step 36, VAR controller 450 causes the closure of the VAR adjustor 540 used at step 34 if the M3C % is greater than a mode 3 close hurdle set point, for example by generating one or more energy delivery parameters $C_{ED}$. The mode 3 close hurdle set point can be, for example the hurdle rate as a percentage to reach when closing VAR adjustors 540 in M3 and can be represented as PCT_CLOSE_TARGET_MODE. After each closure, VAR controller 450 adds the closed MVAR for the VAR adjuster 540 to a TOTAL CLOSED MVAR.

After VAR controller 450 has completed the lagging node loop, VAR controller 450 can determine the MVAR TO UNITY, for example, as in Equation [5].

MVAR TO UNITY=TOTAL CLOSED MVAR-System MVAR.      [5]

Then, for each leading node in the order determined at step 32, the VAR controller 450 determines a mode 3 percentage open (M30%) as a ratio of the node MVAR divided by the MVAR rating of the VAR adjuster 540 to open. VAR controller 450 then causes the opening of the VAR adjustor 540 if the M30% is less than a mode 3 open hurdle set point, for example by generating one or more energy delivery parameters $C_{ED}$. The mode 3 open hurdle set point can be, for example the hurdle rate as a percentage to reach when opening VAR adjustors 540 in M3 and can be represented as PCT_OPEN_TARGET_MODE. After each opening, VAR controller 450 adds the opened MVAR for the VAR adjuster 540 to a TOTAL OPENED MVAR. If the TOTAL OPENED MVAR is greater than the MVAR to Unity, then the loop over the leading nodes ends and step 36 is complete. If a VAR adjuster 540 has been closed in every lagging node during step 36 and the TOTAL OPENED MVAR does not exceed the MVAR TO UNITY, no further nodes are adjusted until after an interval delay discussed below with reference to step 6. After step 36, an interval delay occurs at step 6 before the method is repeated at step 2.

If the system PF is leading, at step 34, for each leading node in the order determined at step 32, the VAR controller 450 determines if the TOTAL OPENED MVAR plus the MVAR of the next VAR adjustor 540 to open is greater than the TARGET OPEN MVAR. If it is, then the loop over the leading nodes ends. Otherwise, a mode 3 percentage open (M30%) as a ratio of the node MVAR divided by the MVAR rating of the VAR adjuster 540 to open. At step 36, VAR controller 450 causes the opening of the VAR adjustor 540 used at step 34 if the M30% is less than a mode 3 open hurdle set point, for example by generating one or more energy delivery parameters $C_{ED}$. The mode 3 open hurdle set point can be, for example the hurdle rate as a percentage to reach when opening VAR adjustors 540 in M3 and can be represented as PCT_OPEN_TARGET_MODE. After each opening, VAR controller 450 adds the opened MVAR for the VAR adjuster 540 to a TOTAL OPENED MVAR.

After VAR controller 450 has completed the leading node loop, VAR controller 450 can determine the MVAR TO UNITY, for example, as in Equation [6].

MVAR TO UNITY=TOTAL OPENED MVAR+System MVAR.      [6]

Then, for each lagging node in the order determined at step 32, the VAR controller 450 determines a mode 3 percentage closed (M3C %) as a ratio of the node MVAR divided by the MVAR rating of the VAR adjuster 540 to close. VAR controller 450 then causes the closure of the VAR adjustor 540 if the M3C % is greater than a mode 3 close hurdle set point, for example by generating one or more energy delivery parameters $C_{ED}$. The mode 3 close hurdle set point can be, for example the hurdle rate as a percentage to reach when closing VAR adjustors 540 in M3 and can be represented as PCT_CLOSE_TARGET_MODE. After each closing, VAR controller 450 adds the closed MVAR for the VAR adjuster 540 to a TOTAL CLOSED MVAR. If the TOTAL CLOSED MVAR is greater than the MVAR TO UNITY, then the loop over the lagging nodes ends and step 36 is complete. If a VAR adjuster 540 has been closed in every leading node during step 36 and the TOTAL CLOSED MVAR does not exceed the MVAR TO UNITY, no further nodes are adjusted until after an interval delay discussed below with reference to step 6. After step 36, an interval delay occurs at step 6 before the method is repeated at step 2. The goal of M3 is to open and close VAR adjusters

540 based on local node conditions, to bring the PF through Unity if possible without exiting M3 and then return in the opposite direction and stop at or as near as possible to unity.

Mode 4

If the system PF determined at step 4 is leading and is less than or equal to LEAD_PF and greater than EMER_LEAD_PF, the VAR controller 450 will operate in M4 and calculate at step 40 a TARGET OPEN MVAR. As just one example, the TARGET OPEN MVAR can be calculated as in Eqn. [7].

$$\text{TARGET OPEN MVAR} = (-1)*\text{System MVAR} - (\text{System MW} * \tan(\cos^{-1}(\text{LEAD\_PF}))) \quad [7]$$

At step 42, VAR controller 450 orders (i.e., sorts) all nodes. First, all leading nodes from most leading to least leading (i.e., by ascending power factor) and then all lagging nodes from least lagging to most lagging (i.e., by descending power factor). At step 44, for each node in the order determined at step 42, the VAR controller 450 determines a mode 4 percentage (M4%) as a ratio of the node MVAR divided by the MVAR rating of the VAR adjuster 540 to open. At step 46, VAR controller 450 causes the opening of one VAR adjustor 540 if the M4% is less than a mode 4 hurdle set point, for example, by generating one or more energy delivery parameters $C_{ED}$. The mode 4 hurdle set point can be, for example the hurdle rate as a percentage to open VAR adjustors 540 and can be represented as PCT_OPEN_LEAD_MODE.

After each closure, VAR controller 450 adds the opened MVAR for the VAR adjuster 540 to a TOTAL OPENED MVAR (the TOTAL OPENED MVAR starts at zero for each repetition of the method) and determines if the TOTAL OPENED MVAR exceeds the TARGET OPEN MVAR determined at step 40. If the TOTAL OPENED MVAR exceeds the TARGET OPEN MVAR, then the VAR controller exits steps 44 and 46. If it does not, then the VAR controller 450 causes the opening of the VAR adjuster in the next node and repeats the determination. However, if the mode 4 hurdle set point is less than zero, the lagging nodes will not be processed. If a VAR adjuster 540 has been opened in every node during step 56 and the TOTAL OPENED MVAR does not exceed the TARGET OPEN MVAR, no further nodes are adjusted until after an interval delay discussed below with reference to step 6. After step 46, an interval delay occurs at step 6 before the method is repeated at step 2. The goal of M4 is to open enough VAR adjusters 540 to go into Target mode but to include the M4% and thus the mode 4 hurdle set point configuration value as an additional factor.

Mode 5

If the system PF determined at step 4 is leading and is less than or equal to EMER_LEAD_PF, the VAR controller 450 will operate in M5 and calculate at step 50 a TARGET OPEN MVAR. As just one example, the TARGET OPEN MVAR can be calculated as in Eqn. [7].

At step 52, VAR controller 450 orders (i.e., sorts) all nodes. First, all leading nodes from most leading to least lagging (i.e., by ascending power factor) and then all lagging nodes from least lagging to most lagging (i.e., by descending power factor). At step 56, for each node in the order determined at step 52, VAR controller 450 causes the opening of one VAR adjustor 540 per node, for example by generating one or more energy delivery parameters $C_{ED}$. After each opening, VAR controller 450 adds the opened MVAR for the VAR adjuster 540 to a TOTAL OPENED MVAR and determines if the TOTAL OPENED MVAR exceeds the TARGET OPEN MVAR determined at step 10. If the TOTAL OPENED MVAR exceeds the TARGET OPEN MVAR, then the VAR controller exits step 56. If it does not, then the VAR controller 450 causes the opening of the VAR adjuster in the next node and repeats the determination. If a VAR adjuster 540 has been closed in every node during step 56 and the TOTAL OPENED MVAR does exceed the TARGET OPEN MVAR, no further nodes are adjusted until after an interval delay discussed below with reference to step 6. After step 56, an interval delay occurs at step 6 before the method is repeated at step 2. The goal of M5 is to open enough VAR adjusters 540 to get into Neutral mode, i.e., operating with a PF close to 1, or in this example, getting into M3.

The example five mode VAR controller 450 prioritizes system which VAR adjusters are closed/opened depending upon system conditions and seeks unity—a state in which VAR load is almost completely balanced and the system is neither lagging or leading. In one example, a specific embodiment of a controller 450 may be configured to ideally operate with a PF between 0.99 lead and 0.99 lag Unity power factor can be desirable to reduce losses and maximize generator stability. VAR controller 450 can be configured to take into account electrical conditions at a plurality of locations. In one example, VAR controller 450 can be configured to take into account electrical conditions at all VAR adjusters 540. VAR controller 450 can be utilized to prioritize VAR adjusters 540. Within each mode, the VAR adjusters 540 are prioritized by their local measurements. However, some operating modes give more weight to the system-level measurements, while the mode closest to unity PF gives more weight to local-level measurements.

VAR controller 450 is configured to allow VAROCS 200 to be responsive to sever system-level operating conditions when warranted, while also allowing local conditions to dominate when warranted. This configuration ensures that all actions taken to address system-level concerts are applied at the location where they are most useful for local-level concerns.

In another example, VAR controller 450 can be configured to determine when a particular node is not in service and exclude it from method 5000. As just one example, VAR controller 450 can determine if the voltage of a particular node is above or below a high or low voltage cutoff set point, respectively.

VAR controller 450 can also be configured to determine whether a particular VAR adjuster is not in service and exclude it from method 5000. Any particular VAR adjuster can be placed out of service manually or automatically. For example, VAR controller 450 can be configured for a maximum daily open or close cycles for any particular VAR adjustor 540. If the number of cycles in a given day for a particular VAR adjustor exceeds the limit, the VAR controller 450 can place the VAR adjustor out of service and exclude it from method 5000. The VAR controller 450 can place the VAR adjustor back into service the following day. Any time period can be used for a cycle limit.

VAR adjustors 540 within a particular node can be prioritized to determine which VAR adjustor 540 should be closed or opened each time VAR controller 450 needs to close or open a VAR adjuster within a particular node. Different prioritization schemes may be used. For example, the VAR adjusters 540 can be prioritized by manually assigning each VAR adjustor 540 a priority. In other examples, VAR adjustors 540 can be prioritized by a number of factors including: first-in-first-out based on last use; by age of service (for example, newly installed VAR adjustors 540 may have a higher priority); least used; alternation; and size of effect on VAR. If more than one VAR adjustor 540 in a particular node has the same priority, VAR controller can be configured to use the VAR adjustor 540 that has the oldest timestamp for the last opening or closing. In one example, only one VAR adjuster 540 is opened or closed within a node at a time. In one particular embodiment, only one capacitor bank will be closed per node per cycle, where a cycle is defined as each pass through "start" in method 5000 of FIG. 5.

In another example, more than one VAR adjuster 540 can be opened or closed within a node at the same time. Although the practice of opening or closing more than one VAR adjuster 540 may cause undesirable transients in the system, transients are minimized as the electrical distance (i.e., the length of transmission line) between VAR adjusters 540 on the same node increases. Thus, the transients can be minimal in some configurations while opening or closing more than one VAR adjuster 540 at the same time.

The individual modes described above can be used independently of the five mode example VAR controller 450. For example, VAR controller 450 can be configured to operate in M3 for all power factors. In another example, VAR controller 450 can be configured to operate with M2, M3, and M4 without a M1 or M5. In another example, VAR controller 450 can be configured to operate with M2 and M4 without a M1, M3, or M5. Depending on the configuration of VAR controller 450, the number and value of the PF set points would be adjusted.

Figure 6:
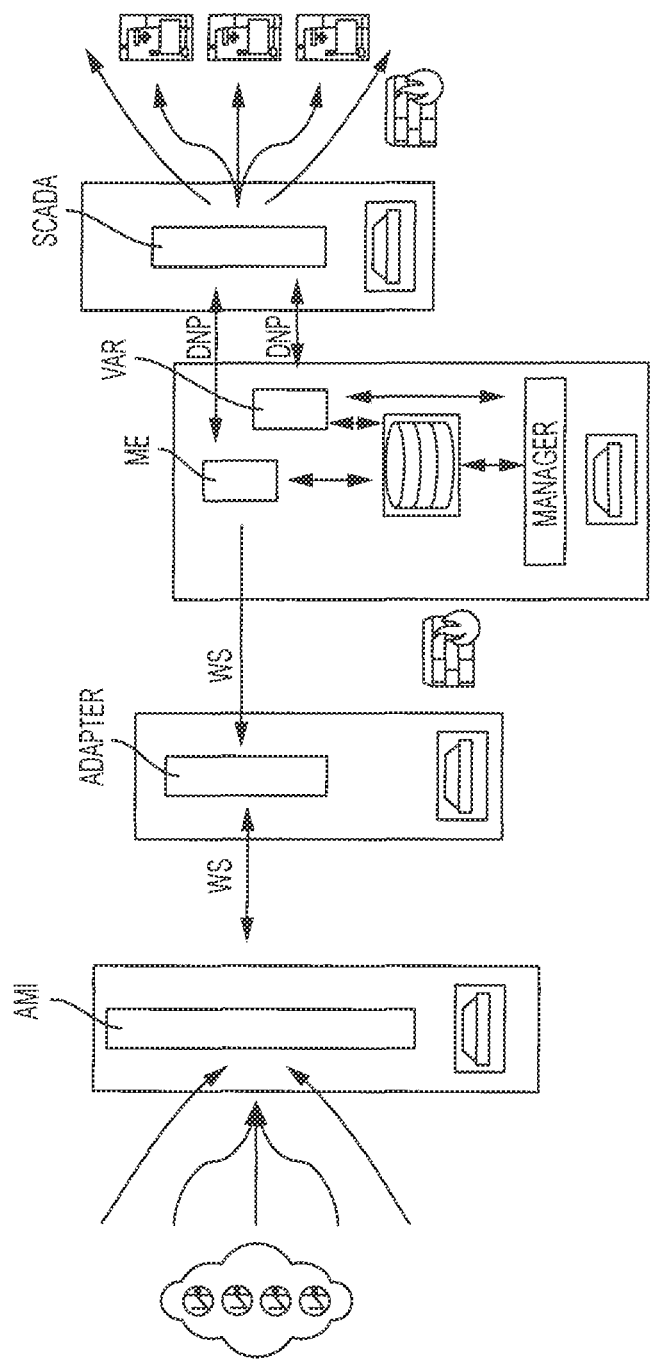
FIG. 6 shows an example system architecture, according to principles of the disclosure.

FIG. 6 shows one example system architecture, according to principles of the disclosure. The Manager can be a Manager Engine "ME" configured to perform the Volt/VAR optimization on the distribution circuits. The VAR Engine can be configured to perform substation and system wide VAR Management. The EDGE Manager user interface can control the Manager Engine "ME" through database manipulation. The EDGE Manager 1.5 user interface can control the VAR engine through database manipulation. The Manager Adapter can collect the AMI data for processing by the ME.

Example embodiments of methods, systems, and components thereof have been described herein. As noted elsewhere, these example embodiments have been described for illustrative purposes only, and are not limiting. Furthermore, certain processes are described, including the description of several steps. It should be understood that the steps need not be performed in the described order unless explicitly identified as such, and some steps described herein may not be performed at all. The breadth and scope of the present invention should not be limited by any of the above described exemplary embodiments, but should be defined only in accordance with the following claims and their equivalents.

What is claimed as new and desired to be protected by Letters Patent of the United States is:

1. A control system for an electric power transmission and distribution grid configured to supply electric power to a plurality of user locations, the system comprising:
    a supply point for generating electrical power;
    a plurality of nodes;
    a plurality of sensors, wherein each sensor is located at a respective one of a plurality of distribution locations on the distribution grid, and wherein each sensor is configured to sense a component of a supplied electric power at the respective distribution location and to generate measurement data based on the sensed component of the power;
    at least one supply point sensor, wherein the at least one supply point sensor is located at or between the supply point and the plurality of nodes and configured to sense a component of a supplied electric power from the supply point;
    a controller configured to receive the measurement data from the plurality of sensors, to determine a system power factor at the supply point and a node power factor at each of the plurality of nodes, and to generate an energy delivery parameter based on the system power factor and/or a system volt-amperes reactive (VAR); and
    at least one VAR adjusting device per each of the plurality of nodes configured to add or subtract VARs to the electric power transmission and distribution grid in response to the energy delivery parameter,
    wherein the controller is further configured to determine (in a determine target step):
    a deficit to target mode when the determined system power factor is lagging and is less than a predetermined lagging power factor set point;
    a surplus to target mode when the determined system power factor is leading and is less than a predetermined leading power factor set point; and
    a target close or open VARs if the determined system power factor is lagging or leading, respectively, when the determined system power factor is greater than the predetermined lagging power factor set point or greater than the predetermined leading power factor set point;
    wherein the controller is further configured to order the nodes (in an ordering step):
    from most lagging to least lagging and then least leading to most leading when the determined system power factor is lagging and is less than the predetermined lagging power factor set point;
    from most leading to least leading and then least lagging to most lagging when the determined system power factor is leading and is less than the predetermined leading power factor set point;
    from most lagging to least lagging if the nodes are lagging and then from most leading to least leading if the nodes are leading when the determined system power factor is lagging and is greater than the predetermined lagging power factor set point; and from most leading to least leading if the nodes are leading and then from most lagging to least lagging if the nodes are lagging when the determined system power factor is leading and is greater than the predetermined leading power factor set point;
    wherein the controller is further configured to adjust one VAR adjusting device per each of the plurality of the nodes in the order from the ordering step until:
    the deficit to target mode is reached when the determined system power factor is lagging and is less than the predetermined lagging power factor set point;
    the surplus to target mode is reached when the determined system power factor is leading and is less than a predetermined leading power factor set point;
    the target close or open VARs is reached if the determined system power factor is lagging or leading, respectively, when the determined system power factor is greater than the predetermined lagging power factor set point or greater than the predetermined leading power factor set point.

2. The system of claim 1, wherein the at least one VAR adjusting device is configured to add or subtract VARs to the electric power transmission and distribution grid when the at least one VAR adjusting device is closed or opened.

3. The system of claim 1, wherein the system power factor represents the power factor for the power supplied to the plurality of nodes and the plurality of distribution locations within the plurality of nodes.

4. The system of claim 1, wherein the at least one VAR adjusting device includes a first node VAR adjusting device within a first node and wherein the controller is configured to adjust the first node VAR adjusting device based on measurement data generated within a second node different than the first node.

5. The system of claim 4, wherein the at least one VAR adjusting device includes a second node VAR adjusting device within the second node and the controller is configured to adjust the at least one VAR adjusting device based on measurement data generated at the second VAR adjusting device.

6. The system of claim 1, wherein the controller is configured to operate in one of a plurality of different operating modes based on the determined system power factor.

7. The system of claim 6, wherein the controller is configured to operate in at least a first and a second operating modes and the first operating mode is configured to prioritize the system power factor over a power factor determined from within a single node when determining whether or not to adjust the at least one VAR adjusting device within the single node.

8. The system of claim 7, wherein the second operating mode is configured to prioritize a power factor determined from within a single node over the system power factor when determining whether or not to adjust the at least one VAR adjusting device within the single node.

9. The system of claim 6 wherein the controller is configured to order the nodes differently between at least two of the operating modes.

10. The system of claim 9, wherein the controller is configured determine the system mode of operation is emergency lag mode when the determined system power factor is lagging and is less than or equal to a predetermined emergency lagging power factor set point.

11. The system of claim 10, wherein the deficit to target mode is an emergency lag target close VARs.

12. The system of claim 11, wherein the controller is configured to close one VAR adjusting device per node until the emergency lag target close VARs is reached, wherein the controller is configure to select the nodes in the order of the sorting of the plurality of nodes in lagging to leading order.

13. The system of claim 12, wherein the controller is configured to determine the emergency lag target close VARs based on an amount of system VARs, a system power load, and the system power factor.

14. The system of claim 9, wherein the controller is configured determine the system mode of operation is emergency lead mode when the determined system power factor is leading and is less than or equal to a predetermined emergency leading power factor set point.

15. The system of claim 14, wherein the surplus to target mode is an emergency lead target open VARs.

16. The system of claim 15, wherein the controller is configured to open one VAR adjusting device per node until the emergency lead target open VARs is reached, and to select the nodes in the order of the sorting of the plurality of nodes in leading to lagging order.

17. The system of claim 16, wherein the controller is configured to determine the emergency lead target open VARs based on an amount of system VARs, a system power load, and the system power factor.

18. The system of claim 1, wherein the energy deliver parameter is further based on at least one node power factor.

19. The system of claim 1, wherein the plurality of distribution locations are the plurality of nodes.

20. The system of claim 1, wherein the controller is configured to determine the node power factor at each of the plurality of nodes is determined at each of a plurality of substations.

21. The system of claim 1, wherein the controller is configured to determine the node power factor at each of the plurality of VAR adjusting devices.

* * * * *